US012583684B2

(12) United States Patent　(10) Patent No.: US 12,583,684 B2
Stumpf　(45) Date of Patent: Mar. 24, 2026

(54) CONVEYOR DEVICE WITH TRANSPORT CASSETTE

(71) Applicant: Wipotec GmbH, Kaiserslautern (DE)

(72) Inventor: Eugen Stumpf, Wedemark (DE)

(73) Assignee: Wipotec GmbH, Kaiserslautern (DE)

( * ) Notice: Subject to any disclaimer, the term of this patent is extended or adjusted under 35 U.S.C. 154(b) by 139 days.

(21) Appl. No.: 18/681,049

(22) PCT Filed: Aug. 4, 2022

(86) PCT No.: PCT/DE2022/100563
§ 371 (c)(1),
(2) Date: Feb. 3, 2024

(87) PCT Pub. No.: WO2023/011691
PCT Pub. Date: Feb. 9, 2023

(65) Prior Publication Data
US 2024/0270501 A1　Aug. 15, 2024

(30) Foreign Application Priority Data

Aug. 6, 2021　(DE) ..................... 20 2021 104 227.3

(51) Int. Cl.
*B65G 21/06*　(2006.01)
*B65G 15/12*　(2006.01)
(Continued)

(52) U.S. Cl.
CPC ............. *B65G 21/06* (2013.01); *B65G 15/12* (2013.01); *B65G 15/60* (2013.01); *B65G 23/44* (2013.01);
(Continued)

(58) Field of Classification Search
CPC ........ B65G 21/06; B65G 15/12; B65G 15/60; B65G 23/44; B65G 2203/0258; B65G 2207/30
(Continued)

(56) References Cited

U.S. PATENT DOCUMENTS

| | | | | |
|---|---|---|---|---|
| 3,944,054 | A | * | 3/1976 | Ensinger ................ B65G 21/06 |
| | | | | 198/860.3 |
| 5,427,228 | A | | 6/1995 | Delsanto |

(Continued)

FOREIGN PATENT DOCUMENTS

| | | | |
|---|---|---|---|
| DE | 102020112457 A1 | 5/1989 | |
| EP | 0146496 A1 | 6/1985 | |

(Continued)

OTHER PUBLICATIONS

International Search Report issued Oct. 27, 2022, in PCT/DE2022/100563.

*Primary Examiner* — Mark A Deuble
(74) *Attorney, Agent, or Firm* — Calvert Technology Law, PLLC; Nathan H. Calvert

(57) ABSTRACT

A conveyor device includes a frame with side parts aligned in a longitudinal direction and at least two transverse parts extending in a transverse direction. A drive roller is mounted in a stationary and rotatable manner on the frame with a drive roller axis extending in the transverse direction. One or more removable transport cassettes are inserted into the frame, each transport cassette having at least one return element extending in the transverse direction. One or more endless belt conveyors circulate around the drive roller, the at least two transverse parts and the one or more transport cassettes.

19 Claims, 6 Drawing Sheets

(51) Int. Cl.
 *B65G 15/60* (2006.01)
 *B65G 23/44* (2006.01)

(52) U.S. Cl.
 CPC .. *B65G 2203/0258* (2013.01); *B65G 2207/30*
 (2013.01)

(58) Field of Classification Search
 USPC ......................................................... 198/841
 See application file for complete search history.

(56) References Cited

U.S. PATENT DOCUMENTS

| | | | | | |
|---|---|---|---|---|---|
| 5,692,597 | A | * | 12/1997 | Ferguson ............... | B65G 15/28 |
| | | | | | 198/841 |
| 6,685,009 | B1 | * | 2/2004 | Hosch .................... | B65G 23/44 |
| | | | | | 198/813 |
| 6,871,737 | B2 | * | 3/2005 | Ertel ...................... | B65G 23/44 |
| | | | | | 198/813 |
| 7,267,223 | B2 | * | 9/2007 | Spoors ................... | B65G 21/02 |
| | | | | | 198/860.3 |
| 8,469,182 | B2 | * | 6/2013 | Alotto .................... | B65G 23/44 |
| | | | | | 198/813 |
| 11,014,752 | B2 | * | 5/2021 | Treise .................... | B65G 15/64 |
| 11,333,543 | B2 | * | 5/2022 | Van Blokland ....... | G01G 11/003 |
| 12,240,704 | B2 | * | 3/2025 | Höhler ................... | B65G 21/06 |
| 2009/0277753 | A1 | | 11/2009 | Violle | |
| 2010/0243412 | A1 | | 9/2010 | Brayman | |
| 2011/0073443 | A1 | * | 3/2011 | Trivette ................ | B65G 23/22 |
| | | | | | 198/813 |

FOREIGN PATENT DOCUMENTS

| | | | |
|---|---|---|---|
| EP | 1584580 | A1 | 10/2005 |
| EP | 2928304 | B1 | 10/2016 |
| JP | 2016003917 | A | 1/2016 |

* cited by examiner

CONVEYOR DEVICE WITH TRANSPORT CASSETTE

TECHNICAL FIELD OF THE INVENTION

The invention involves a conveyor device with one or more endless conveyors configured to convey objects in a longitudinal direction.

BACKGROUND OF THE INVENTION

Conveyor devices employing endless conveyors are used, for example, in the form of belt conveyors in food production.

In modern food production, slices of products (such as sausage or cheese) may be cut from long blocks, portioned, checked, inspected and packaged. Before, during or after slicing, various control and inspection steps are usually carried out for quality assurance, weight control and inspection for foreign matter, for example by weighing and X-raying.

The food blocks can be of different dimensions. In order to achieve a high throughput, wider blocks are processed individually, whereas narrower blocks are processed simultaneously (in parallel) in a multi-track operation.

SUMMARY OF THE INVENTION

It is an object of the present invention to provide a conveyor device that enables simple adaptation to changed requirements by changing the track width and/or the number of tracks.

Conveyor devices in accordance with one aspect of the invention include at least one transport cassette, which an operator can insert into or remove from a frame, and the conveyor device can easily be converted in order to adapt it to modified products to be conveyed, in particular for modified product dimensions.

By providing a stationary drive roller on the frame, preferably in the frame, the axis of which extends in the transverse direction y and the length of which extends essentially over the entire width of the frame, a single drive roller can directly act on or drive one or more endless conveyors for the purpose of driving. In contrast to a drive axle, a drive roller engages directly with the endless conveyor. If the endless conveyor is designed as an endless belt, for example, at least part of the outer roller surface or roller shell is in direct contact with the inner surface or inner side of the belt.

Of course, the endless conveyor, which forms a physical transport track (in each case), can be designed in any form known, such as a belt, strap, several smaller individual belts, a chain or a plate chain, depending on the intended use.

Since the transport cassette or the transport cassettes contain at least one return element that returns the endless conveyor, preferably in the form of a rolling part, a return roller, a return edge, etc., by removing the transport cassette or several transport cassettes (after removing the respective endless conveyor) by inserting another transport cassette and/or changing the number of transport cassettes, the conveyor device can be easily adapted in terms of both track width and number of tracks, depending on the requirements.

The provision of transport cassettes that can be removed by an operator also makes it easier to clean the entire conveyor device, which is usually necessary at regular intervals, particularly in the food industry. Furthermore, in the event of failure, individual components can be replaced more easily by removing and replacing the transport cassette compared to replacing components in conveyor devices that do not have transport cassettes according to the invention.

If several transport cassettes are used, each individual transport cassette can be removed from or inserted into the frame directly on its own, i.e. independently of each other, separately (for example downwards or preferably upwards in the vertical direction z), without the need to remove the other, in particular adjacent, transport cassettes for this purpose. Removal upwards or downwards also includes slanted directions, provided that the movement has a component in the vertical direction z.

In some embodiments, one or more stationary transport cassettes are mounted in the longitudinal direction x and in the transverse direction y by means of corresponding stops on or in the frame. The degree of freedom in the vertical direction z of one or more transport cassettes is limited by the respective endless conveyor and, in particular when the endless conveyor is in a tensioned state, it is fixed. Of course, a stop limiting downwards (or upwards) movement in the vertical direction z and an additional stop acting upwards (or downwards) in the vertical direction in the form of a quick-release fastener (spring, hook, etc.) can be placed between the frame and the transport cassette(s).

The corresponding stops can, for example, be designed as mutually complementary engagement elements on the frame and the transport cassette, such as grooves, slots, recesses, U-shaped troughs, which are brought into engagement with corresponding counter elements, such as transverse members, side parts, rails, pins, projections, when a transport cassette is inserted into the frame.

In some embodiments of the invention, at least two of the transverse parts of the frame act as stops for the one or more inserted transport cassettes in at least one direction x, z, y, wherein the one or more inserted transport cassettes preferably also rest on the transverse parts in or against the vertical direction z.

A conveyor device in accordance with the present invention may also have a tensioning device (acting in any radial direction) by means of which one or more endless conveyors are tensioned and, in a relaxed state, can be removed in the transverse direction y from the frame and from one or more transport cassettes contained in the frame. Relaxing the tension offers the advantage of making it easier to remove and attach an endless conveyor, since otherwise the endless conveyor would have to be stretched accordingly or at least part of the conveyor device would have to be assembled or disassembled for this purpose.

In some implementations, one or more transport cassettes have two preferably outer side parts aligned in the longitudinal direction x and at least one spacer part determining the spacing in the transverse direction y, preferably for the outer side parts. For example, two separately formed side parts can be connected by two spacer parts in the form of transverse members or by a spacer part in the form of a base and/or a lid (possibly with cut-outs). Of course, it is also possible to form the side parts and base or lid in the form of a one-piece U-profile, in particular as a bent sheet metal part.

The one or more transport cassettes may contain guide elements for one or more endless conveyors. Preferably, the guide elements and/or the return element are mounted in the side parts of the transport cassette or are mounted in a stationary position. Preferably, the guide elements and/or the return element can be removed by an operator, preferably in the vertical direction z, and/or are designed as rotatable rollers. Because the guide elements and/or the return element can be easily removed, this also offers the advantage of making it easier to remove (and re-insert) other components of the conveyor device for replacement or cleaning.

In some embodiments of the invention, the one or more transport cassettes are formed in at least two parts and with a carriage which is displaceable in the longitudinal direction x (relative to the remaining part or parts of the transport cassette). In this case, the displaceable carriage includes the return element for tensioning and releasing one or more endless conveyors and thereby establishing or releasing the coupling of one or more endless conveyors to the drive roller. Clamping and unclamping can be performed by an actuator, in particular a pneumatic cylinder, which moves the displaceable carriage.

Such an actuator can preferably be provided for each transport cassette, although it is of course also possible to provide an actuator for several transport cassettes in the conveyor device.

In other embodiments of the invention, at least one, preferably each, transport cassette has an actuator, so that the actuator is part of a transport cassette.

In some implementations of the invention, the frame remains in a machine when transport cassettes are replaced. The machine can be designed, for example, as an X-ray inspection device, metal detector device or scale. The transport cassette can be designed at least partially as a weighing belt or include such a belt. This offers the advantage of leaving the frame unchanged in its installation position in the machine, even when transport cassettes are inserted and/or removed, so that once the frame and thus the conveyor device have been adjusted, they do not have to be readjusted even after cleaning, maintenance, changing the number of tracks, etc.

In other embodiments of the invention, several transport cassettes with the same or different widths can be inserted into the frame. This increases the customization options (track widths and/or number of tracks) of the conveyor device.

An endless conveyor can circulate around one or more transport cassettes and cover their width in order to form a physical track of determinable width. This offers the advantage of further increasing the possibilities for adapting the number and/or width and/or position of tracks according to a particular requirement. Since an endless conveyor can also be designed in the form of several (narrow) individual belts, in particular straps, it is of course also possible for several narrow individual belts to circulate around a transport cassette.

In some implementations of the invention, at least one transport cassette, preferably each transport cassette, includes at least one load cell in order to determine the weight of the products conveyed by the conveyor device.

Of course, it is also possible to form logical tracks (for example for the joint conveying of an extra-wide product) from individual or several transport cassettes with a respective circulating endless conveyor by corresponding synchronous control of the actuators.

As explained above, by providing insertable and removable transport cassettes, the modular design of the conveyor device according to the invention makes it much easier to replace components and to adapt to new requirements (number of tracks, track width) as well as to maintain and clean the conveyor device.

These and other aspects, advantages, and features of the invention will be apparent from the following description of representative embodiments, considered along with the accompanying drawings.

DESCRIPTION OF REPRESENTATIVE EMBODIMENTS

Figure 1:
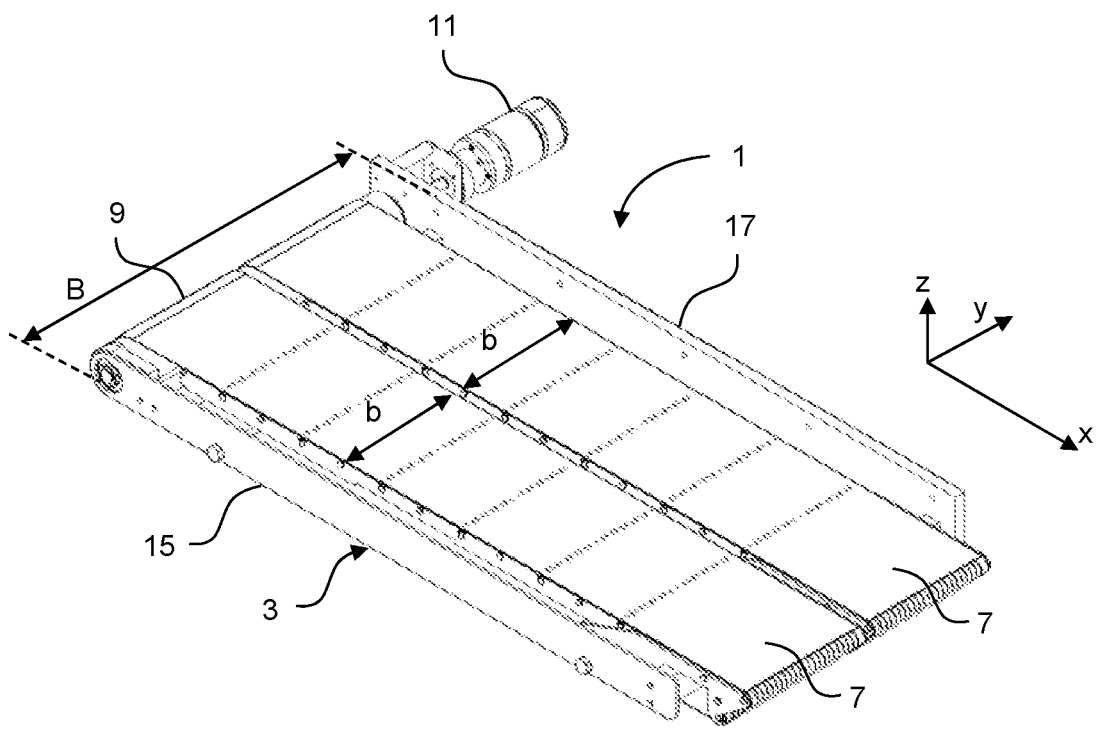
FIG. 1 is a perspective view from diagonally above a first embodiment of a belt conveyor according to the invention with two inserted transport cassettes and two belts.

The belt conveyor 1 shown in FIG. 1 to FIG. 4 includes a frame 3, which is made up of two external side parts 15 and 17 and transverse parts 19 and 21 connecting them. The length of the transverse parts thus essentially determines the width B of the frame 3.

In order to be able to pull a relaxed belt 7 (endless conveyor) from the right of the belt conveyor 1, the right-hand side part 15 visible in the x-direction has a low height in the z-direction (also lower length in the x-direction), preferably less than the diameter of the drive roller 9.

The opposite side part 17, on the other hand, can have a greater height, for example for stability reasons. A motor 11 is attached to this side part to drive a drive roller 9, which is located at the front end between the side parts 15 and 17 as viewed in the x-direction. Of course, the motor 11 can also be located inside the drive roller 9.

In the tensioned state, the two belts 7 shown in FIG. 1 are propelled by the drive roller 9, thus driving the upper side of the belt in the conveying direction x.

Figure 2:
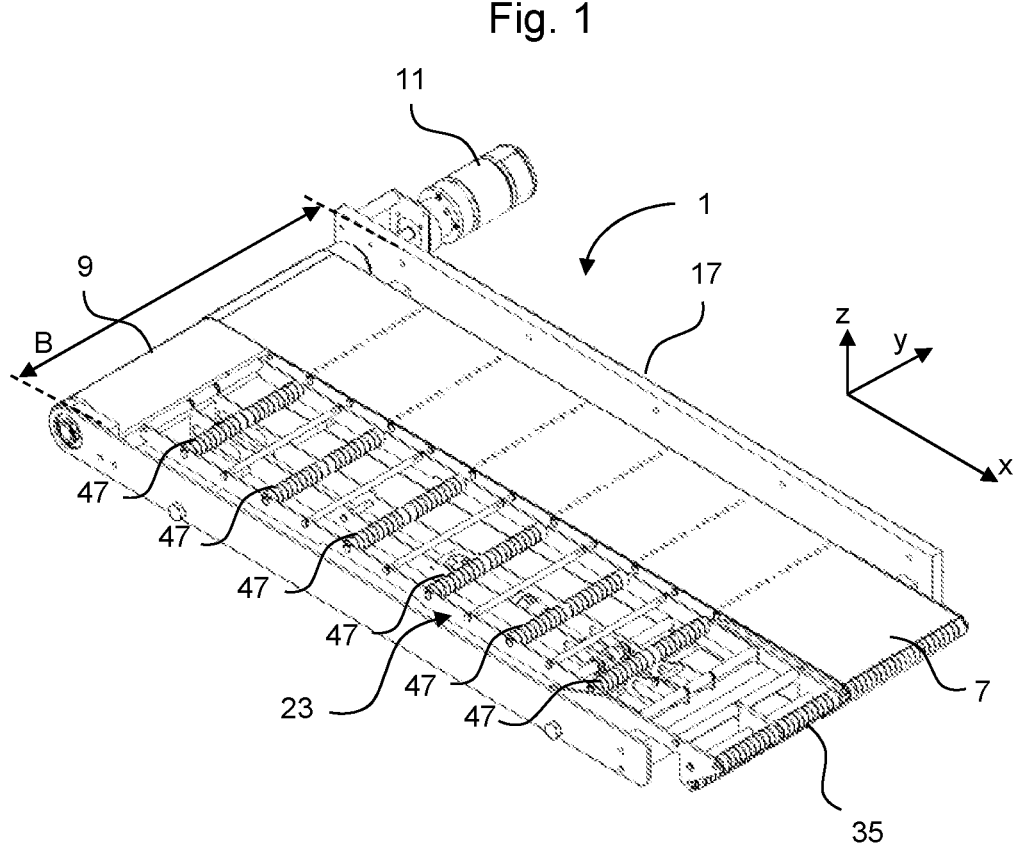
FIG. 2 is a perspective view from diagonally above the first embodiment according to FIG. 1 with one belt removed.
Figure 3:
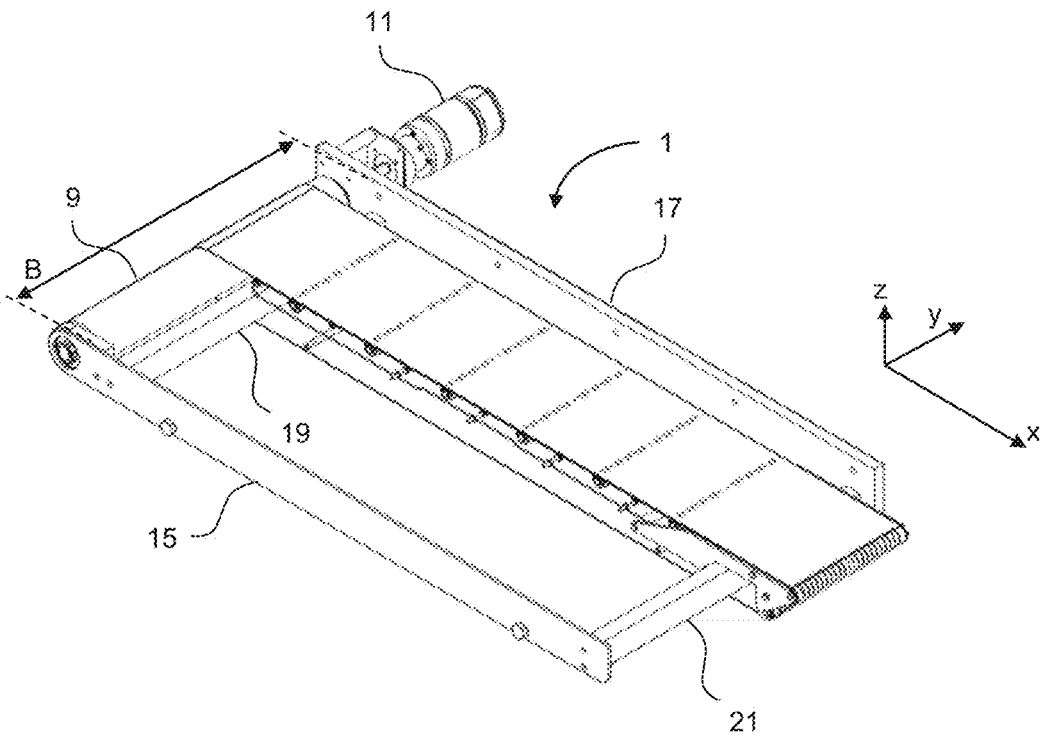
FIG. 3 is a perspective view from above of the first embodiment according to FIGS. 1 and 2 with one transport cassette removed.

At the end of the belt conveyor 1 opposite the drive roller 9, there is at least one return roller 35 per belt (see FIG. 2).

Unlike the drive roller 9, the return roller 35 is not mounted directly in the frame 3, but rather in a transport cassette 23 that can be inserted into the frame and removed.

When inserted, the transport cassette 23 is mounted in a stationary position at least in the longitudinal direction x and transverse direction y, but can be removed upwards or diagonally upwards, as shown in the drawing, viewed in the z-direction. Perpendicular to the vertical direction z, the transport cassette 23 sits in or on the frame 3, in particular the transverse parts 19, 21, and is prevented from moving in the vertical direction z by the tensioned belt 7.

Figure 4:
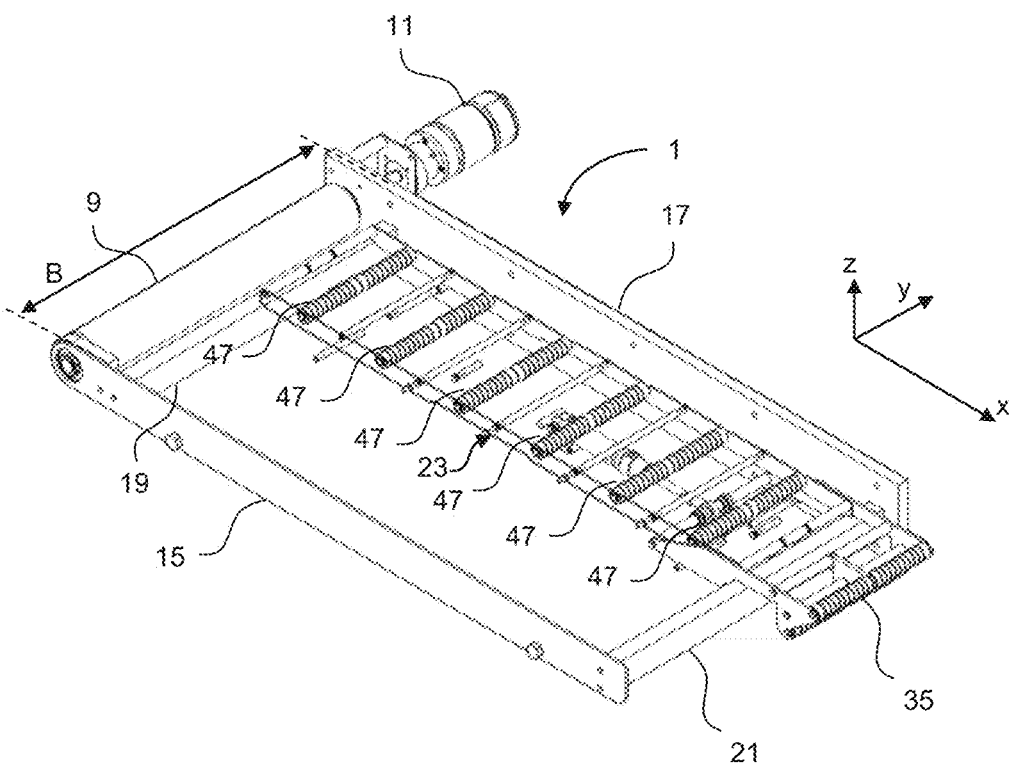
FIG. 4 is a perspective view from diagonally above of the first embodiment according to FIGS. 1 to 3 with one transport cassette removed and without a belt.
Figure 5:
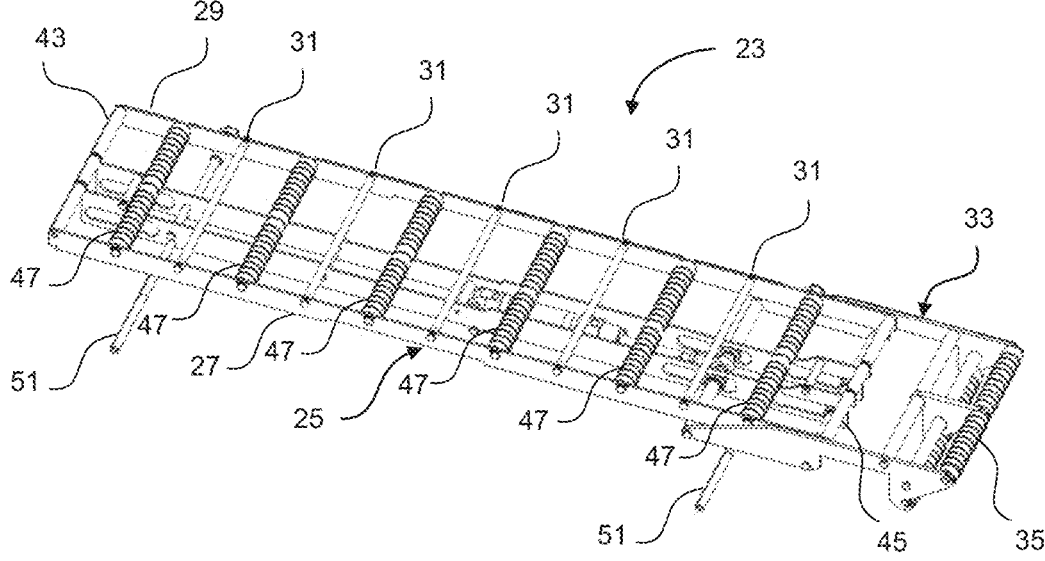
FIG. 5 is a perspective view from diagonally above of a removed transport cassette from FIGS. 1 to 4.
Figure 6:
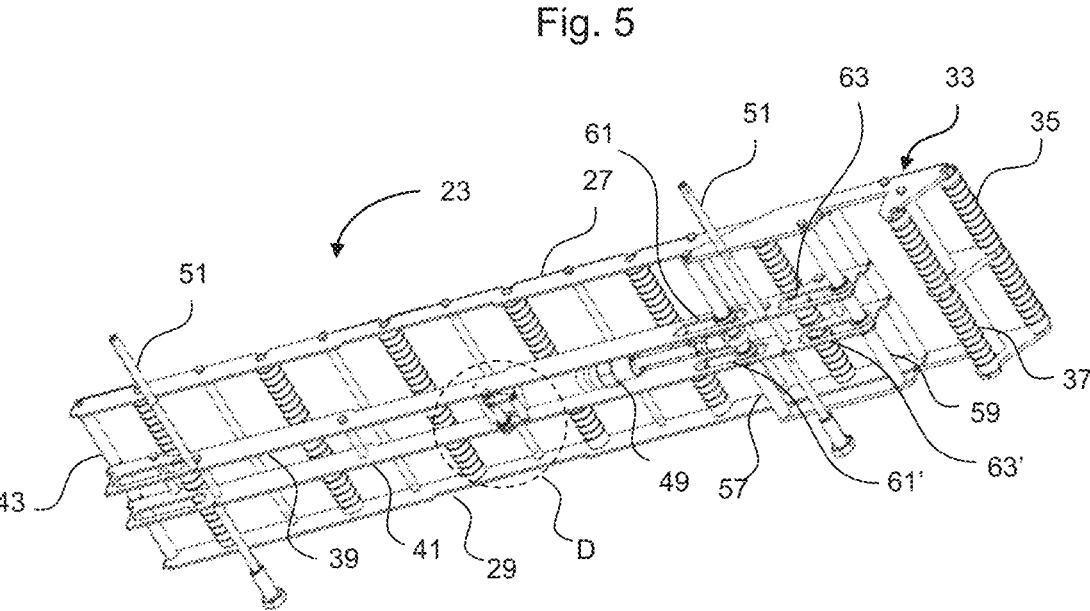
FIG. 6 is a perspective view from diagonally below of a transport cassette according to FIG. 5.

As can be seen from FIG. 4 and in particular FIGS. 5 and 6, the transport cassette 23 has outer side parts 27 and 29 which are parallel to one another when viewed in the x-direction and which are connected to form a fixed frame by front and rear spacer parts 43 and 45 extending in the transverse direction y.

Multiple guide rollers 47, preferably six as in the example shown, are mounted in the side parts 27 and 29 at different, preferably equidistant bearing points for guiding the upper side of the belt 7. The ends of the axles of these guide rollers 47 can be inserted from above into the grooves or bearing points, for example in a U-shape, and are held by the belt 7 in the tensioned state circulating around the transport cassette 23 to prevent them from coming loose from the bearing points.

As can be seen in FIG. 5, the side parts 27 and 29 of the transport cassette 23 are also connected to transverse parts 31, which are preferably equidistant, in order to increase the stability of the transport cassette 23.

Parallel to side parts 27 and 29, two center bars 39 and 41 are located in the inside area of the transport cassette 23 below the rollers 47 and the transverse parts 31, and, viewed in the x-direction, are permanently attached at their front ends to the front spacer part 43 and at their back ends to the rear spacer part 45.

As can be seen from FIG. 6, the front ends of the center bars 39 and 41 are designed as right-angled stops or stop surfaces, with the vertical areas (extending in the z-direction) serving as stops in the x-direction and the horizontal areas (extending in the x-direction) serving as stops or supports (against the z-direction) in relation to the transverse parts 19 and 21. When the transport cassette is inserted and the belt is tensioned, the front ends of the center bars 39 and 41 engage with the vertical areas of the transverse part 19, so that the inserted transport cassette is held in the x-direction. In the vertical direction z, the transport cassette resting on the transverse parts 19 and 21 is held in the tensioned state of a belt 7 circulating around it (in the same way as the guide rollers 47).

At the rear end of the transport cassette 23, as seen in the x-direction, there is a carriage 33 that can be displaced in the x-direction with respect to the main part 25 of the transport cassette 23. Thus the illustrated transport cassette 23 is formed in two parts comprising a first part (main part 25) and a second part (carriage 33). The return roller 35 and preferably an additional return roller 37 are mounted on the carriage 33. In this embodiment example, the additional return roller 37 positioned diagonally below the return roller 35 compensates for the significantly larger diameter of the drive roller 9 and enables parallel guidance of the upper and lower sides of the belt 7, which is advantageous for reasons of space.

The carriage 33 can be moved by a pneumatic cylinder 49 between a retracted position (belt relaxed) and an extended position (belt tensioned).

Figure 7:
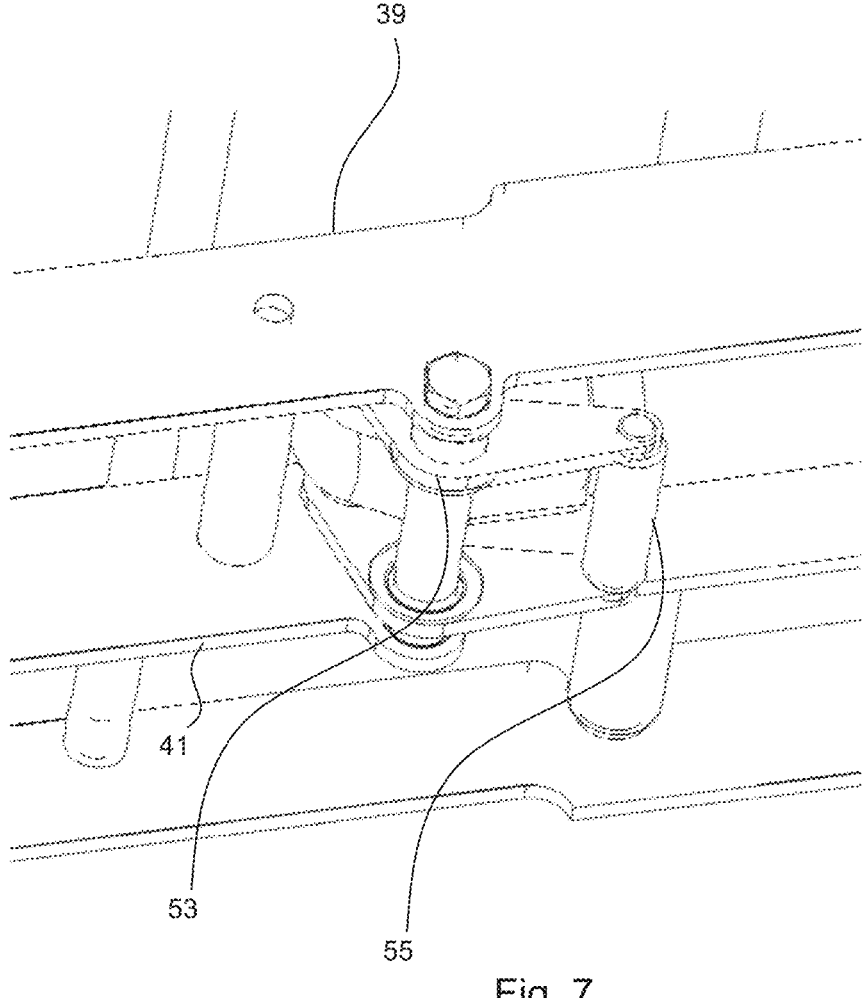
FIG. 7 is an enlarged view of a Detail D in FIG. 6.

As can be seen from FIGS. 6 and 7, the base of the pneumatic cylinder 49 is positioned on a wing of a swivel lever 53, which is mounted between the center bars 39 and 41 so that the swivel lever 53 can rotate about a rotational axis in the y-direction. At its opposite end, the cylinder is positioned against a front transverse part 57 of the carriage 33. When the cylinder 49 is retracted in order to relax the belt 7 at the return roller 35 (and 37), this causes the swivel lever 53 to rotate, so that its wing 55 (stop roller) folds downwards and in conjunction with a pressing element or area of the frame or a machine base not shown in the drawing, stops the movement of the lower side of the belt 7 and thus safely and immediately stops the conveying of products.

The carriage 33 also has a rear transverse part 59 which, like the front transverse part 57, is connected to the side walls of the carriage 33 in the transverse direction y.

The transverse parts 57 and 59 extend through front and rear slots 61, 63 and 61', 63' in the center bars 39 and 41, and serve as guides for the movement of the carriage 33 along the x-direction. In addition, bearings, for example in the form of cylinders with recesses, grooves, etc., are located on the transverse parts 57 and 59 as engagement elements for the slots 61, 63 and 61', 63', which prevent the carriage 33 from moving in the y-direction.

The spacers 51 shown in FIGS. 5 and 6 are each positioned on the center bars 39 and 41, for example by being screwed on, and extend outwards in the transverse direction y. The spacers 51 thus serve as a lateral spacing between adjacent transport cassettes 23 and/or for the frame 3.

The length of the spacer elements 51 can be selected and used depending on the desired spacing between the outer side parts 15, 17 of the frame 3 or between adjacent transport cassettes 23.

Of course, it is also possible to accurately position adjacent transport cassettes in relation to each other via other stops or via stops or grooves in the frame 3 also in the transverse direction y.

Figure 8:
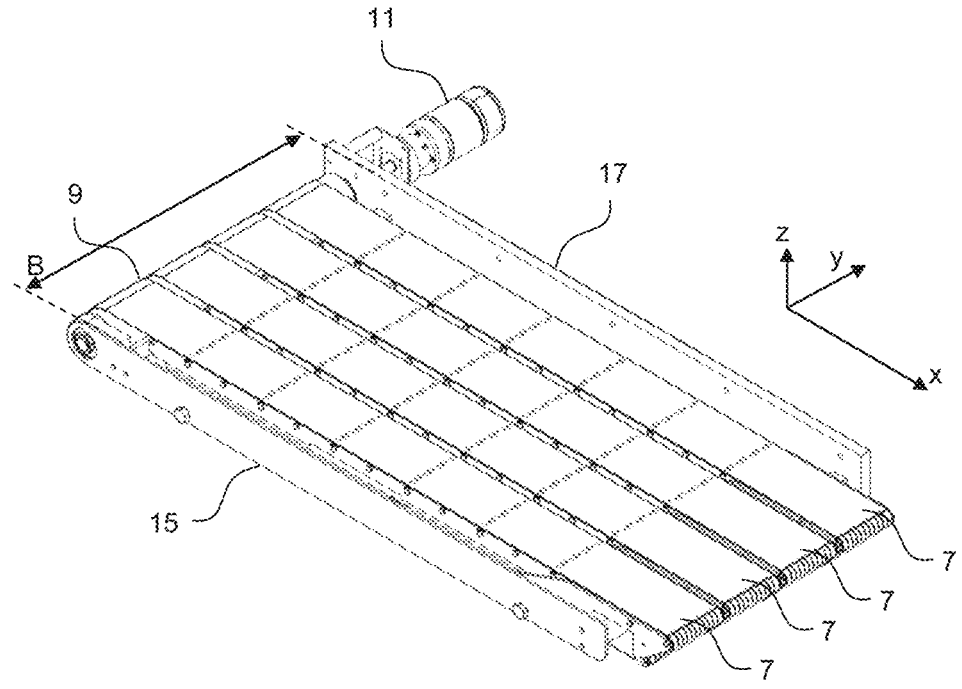
FIG. 8 is a perspective view from diagonally above of a second embodiment of a belt conveyor according to the invention with four inserted transport cassettes and four belts.
Figure 9:
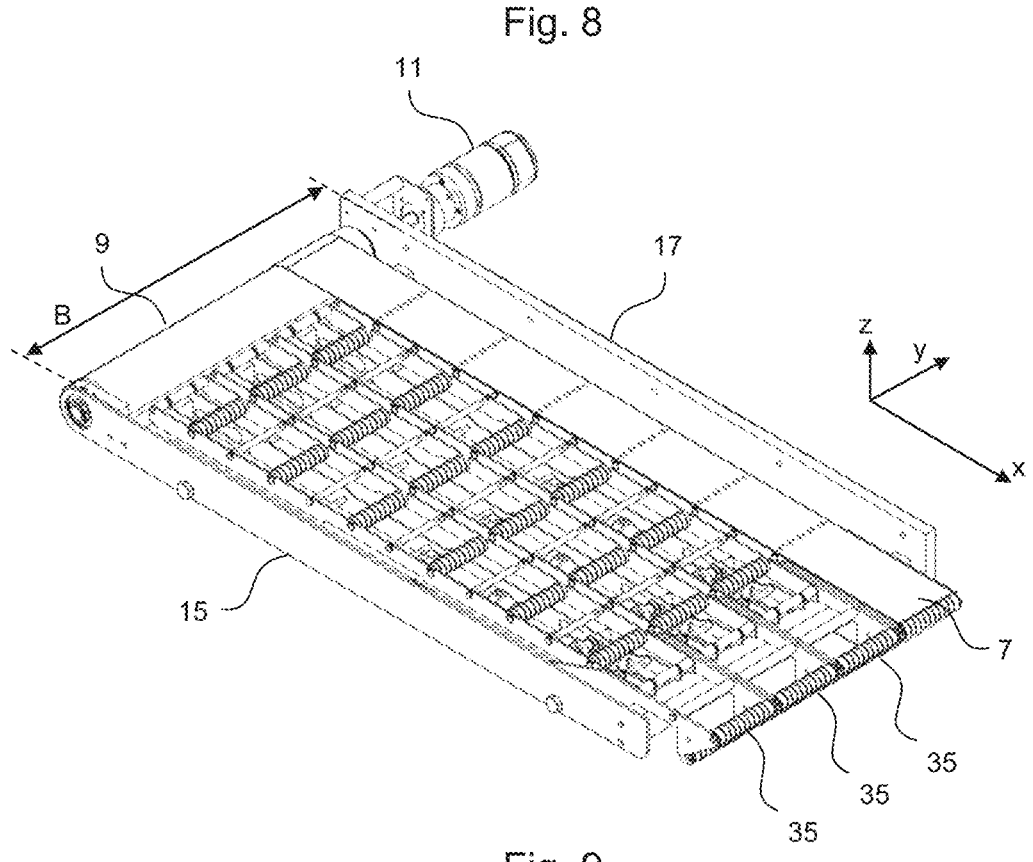
FIG. 9 is a perspective view from diagonally above of the second embodiment according to FIG. 8 with three belts removed.

The second embodiment shown in FIGS. 8 and 9 shows a belt conveyor according to the invention with four inserted transport cassettes 23 in contrast to the first embodiment with two transport cassettes 23, whereby the above explanation also applies to this embodiment, apart from the change in the number of transport cassettes 23.

In this case, four transport cassettes 23 with a smaller width are inserted into the frame 3, resulting in four physical tracks. Of course, it is also possible to use a different number (for example, three or five) of transport cassettes 23 of equal width. It is also possible to insert transport cassettes 23 of different widths into the frame 3 and preferably to fill the entire width of the frame. However, it is also possible not to fill the frame 3 completely and to leave gaps.

Figure 10:
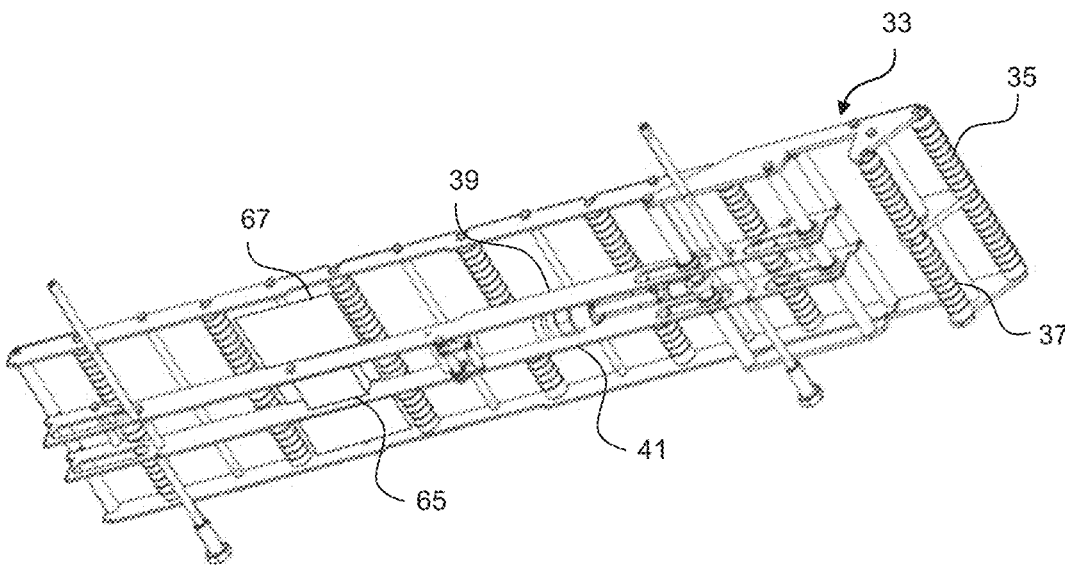
FIG. 10 is a perspective view from diagonally below of an embodiment of a transport cassette with load cell.
Figure 11:
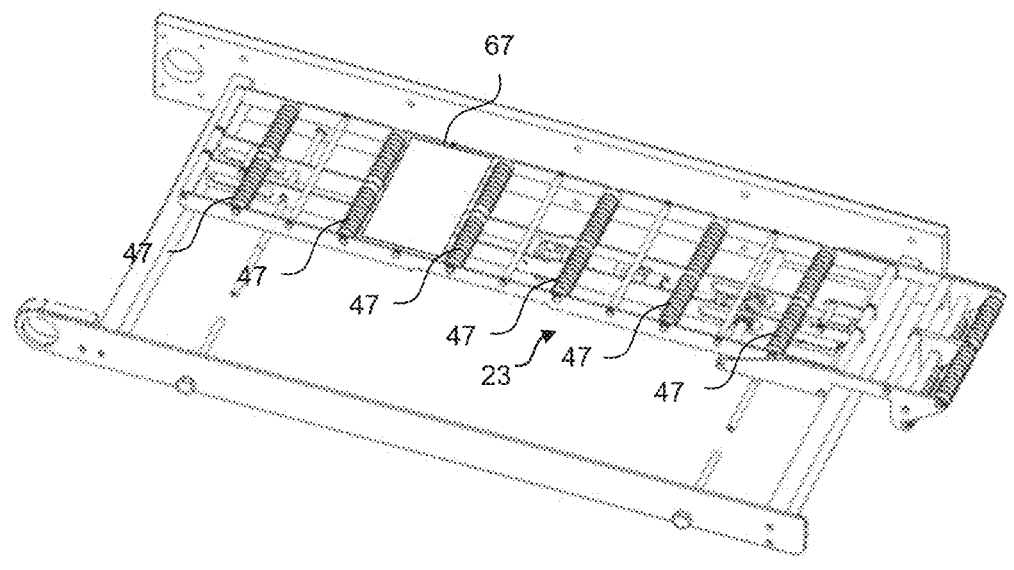
FIG. 11 is a perspective view from diagonally above of the embodiment of a transport cassette according to FIG. 10 inserted in a frame without a drive roller.

The embodiment of a transport cassette 23 shown in FIGS. 10 and 11 differs from the embodiment of a transport cassette explained above, in that in this embodiment, the transport cassette includes a load cell 65. As shown in FIG. 10, the load cell 65 is positioned between the center bars 39 and 41 and is firmly connected to them.

Viewed in the z-direction, the load cell 65 supports a weighing platform 67, which is positioned between two rollers 47 and over which the belt 7 is guided, so that the weight of a product transported on the belt 7 is weighed in this area or the weighing platform 67 acts as a load receptor. Of course, other forms of load receptors for weighing products are also possible. For example, it is possible to design parts of the transport cassette 23, in particular the outer side parts 27, 29 and the transverse parts 31, as load receptors or as a weighing platform of a load cell 65 attached to the center bars 37, 39 (mainland). Several load cells can also be positioned in a transport cassette and together support a weighing platform.

For viewing purposes only, the frame 3 shown in FIG. 11 has no drive roller 9, but it is otherwise identical to the frame of the embodiments explained above.

Weighing can be performed in dynamic mode (without stopping) or in static mode (start/stop mode, preferably with the stop roller or wing 55 described above).

In any case and independently of the examples of the embodiments shown, according to the invention, the advantage is offered of making it possible to remove an associated transport cassette 23 from the frame 3 after removing a respective belt 7, without having to remove other, in particular adjacent transport cassettes 23 for this purpose.

This makes it easier to clean, maintain or replace defective elements of a belt conveyor, as well as to change the track width and/or the number of tracks as desired.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The directions referenced herein and in the following claims, namely, the x or longitudinal direction, the z or vertical direction, and the y or width/transverse direction refer to the corresponding directions indicated in the drawings relative to the conveyor device 1 and transport cassette 23 as oriented therein.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE SYMBOLS

1 Belt conveyor
3 (Outer) frame

7 Belt
9 Drive roller
11 Drive
15 Outer right side part
17 Outer left side part
19 Front transverse part of the frame
21 Rear transverse part of the frame
23 Transport cassette
25 Main part of the transport cassette
27 Outer right side part of the transport cassette
29 Outer left side part of the transport cassette
31 Transverse parts of the transport cassette
33 Carriage
35 First return roller
37 Second return roller
39 Right-hand center bar of the transport cassette
41 Left-hand center bar of the transport cassette
43 Front spacer part
45 Rear spacer part
47 Guide rollers
49 Pneumatic cylinder
51 Spacer to the adjacent transport cassette (different elements)
53 Swivel lever
55 Swivel lever wing (stop roller)
57 Front transverse section of the carriage
59 Rear transverse section of the carriage
61 Front slot of the right-hand center bar 39
63 Rear slot of the left-hand center bar 39
61' Front slot of the left-hand center bar 41
63' Rear slot of the left-hand center bar 41
65 Load cell
67 Weighing platform.

The invention claimed is:

1. A conveyor device for conveying products in a longitudinal direction, the conveyor device including:
   (a) a frame with frame side parts aligned in the longitudinal direction and at least two frame transverse parts extending in a transverse direction perpendicular to the longitudinal direction so that a width of the frame is essentially determined by the length of the frame transverse parts;
   (b) a drive roller located on the frame, the rotational axis of the drive roller extending in the transverse direction and having a drive roller length extending essentially the entire width of the frame;
   (c) a transport cassette inserted into a transport cassette mounted position on the frame in which the transport cassette is fixed in place relative to the frame in the longitudinal direction and the transverse direction;
   (d) the transport cassette having a transport cassette return element that extends in the transverse direction when the transport cassette is in the transport cassette mounted position; and
   (e) an endless conveyor positioned on the frame and transport cassette in an endless conveyor operating position to revolve around the drive roller, the frame transverse parts, and the transport cassette return element.

2. The conveyor device of claim 1 further including a tensioning device for moving the endless conveyor between a relaxed state and a tensioned state and wherein:
   (a) a first one of the frame side parts is positioned in the frame and has a shape in a vertical direction and the longitudinal direction such that the endless conveyor in the relaxed state is movable in the transverse direction so as to slide over the first one of the frame side parts for removal of the endless conveyor from the conveyor device; and (b) the transport cassette is movable in the vertical direction for removal from the frame when the endless conveyor is displaced from the endless conveyor operating position by an amount greater than a width of the transport cassette in the transverse direction.

3. The conveyor device of claim 1 wherein the transport cassette includes:

(a) two cassette outer side parts aligned in the longitudinal direction when the transport cassette is in the transport cassette mounted position in the frame; and (b) at least one transport cassette spacer part which determines a spacing for the two cassette outer side parts in the transverse direction.

4. The conveyor device of claim 1 wherein one of the at least two frame transverse parts provides a stop for the transport cassette in at least one of the longitudinal direction, transverse direction, or vertical direction when the transport cassette is in the transport cassette mounted position in the frame.

5. The conveyor device of claim 1 wherein the transport cassette includes guide elements for the endless conveyor.

6. The conveyor device of claim 5 wherein the guide elements and the transport cassette return element are mounted on two cassette outer side parts that are positioned in the transport cassette so as to be aligned in the longitudinal direction when the transport cassette is in the transport cassette mounted position in the frame.

7. The conveyor device of claim 6 wherein the guide elements and the transport cassette return element each comprise rotatable rollers.

8. The conveyor device of claim 1 wherein the transport cassette includes:

(a) a transport cassette main part; and (b) a carriage on which the transport cassette return element is mounted, the carriage being displaceable in the longitudinal direction with respect to the transport cassette main part when the transport cassette is in the transport cassette mounted position on the frame to facilitate alternatively tensioning or relaxing the endless conveyor.

9. The conveyor device of claim 8 further including an actuator connected between the transport cassette main part and the carriage and operable to move the carriage in the longitudinal direction relative to the transport cassette main part when the transport cassette in in the transport cassette mounted position on the frame.

10. The conveyor device of claim 9:

(a) further including at least one additional transport cassette inserted into a respective additional transport cassette mounted position on the frame in which the respective additional transport cassette is stationary in the longitudinal direction and the transverse direction relative to the frame;

(b) wherein each additional transport cassette has a respective additional transport cassette return element that extends in the transverse direction when the respective additional transport cassette is in the respective additional transport cassette mounted position, and wherein each additional transport cassette is formed in respective first and second parts with the respective first part being displaceable with respect to the respective second part when the respective additional transport cassette is in the respective additional transport cassette mounted position; and (c) wherein each additional transport cassette includes a respective additional actuator connected between the first and second parts of the respective additional transport cassette and operable to move the second part with respect to the first part.

11. The conveyor device of claim 1 wherein the transport cassette is moveable in a vertical direction when the endless conveyor is removed from the conveyor device to facilitate removal of the transport cassette from the frame while the frame remains in a device operating position in a machine in which the conveyor device is included.

12. The conveyor device of claim 1 further including an additional transport cassette inserted into an additional transport cassette mounted position on the frame in which the additional transport cassette is stationary in the longitudinal direction and the transverse direction relative to the frame, the additional transport cassette having an additional transport cassette return element that extends in the transverse direction when the additional transport cassette is in the additional transport cassette mounted position.

13. The conveyor device of claim 12 wherein the endless conveyor in the endless conveyor operating position is mounted to revolve around the drive roller, the frame transverse parts, the transport cassette return element, and the additional transport cassette return element.

14. The conveyor device of claim 12 wherein an additional endless conveyor is mounted on the frame and the additional transport cassette in an additional endless conveyor operating position to revolve around the drive roller, the frame transverse parts, and the additional transport cassette return element.

15. The conveyor device of claim 1 wherein the transport cassette includes a load cell operable to determine the weight of a product conveyed by the conveyor device.

16. A transport cassette for use in a conveyor device for conveying products in a longitudinal direction, the conveyor device including, (i) a frame with frame side parts aligned in the longitudinal direction and at least two frame transverse parts extending in a transverse direction perpendicular to the longitudinal direction so that a width of the frame is essentially determined by the length of the frame transverse parts; and (ii) a drive roller located on the frame, the rotational axis of the drive roller extending in the transverse direction and the drive roller having a drive roller length extending essentially the entire width of the frame;

the transport cassette including:

(a) two cassette outer side parts that are aligned in the longitudinal direction when the transport cassette is inserted in a transport cassette mounted position in the frame in which the transport cassette is fixed in place relative to the frame in the longitudinal direction and transverse direction;

(b) a transport cassette return element that extends in the transverse direction when the transport cassette is in the transport cassette mounted position;

(c) at least one transport cassette spacer part which determines a spacing for the two cassette outer side parts in the transverse direction; and (d) stop features adapted to abut one of the at least two frame transverse parts when the transport cassette is in the transport cassette mounted position on the frame, the abutment preventing movement of the transport cassette in the longitudinal direction toward an end of the frame at which the drive roller is located.

17. The transport cassette of claim 16:

(a) further including guide elements for an endless conveyor, the guide elements extending in the transverse direction when the transport cassette is in the transport cassette mounted position on the frame; and (b) wherein the guide elements and the transport cassette return element are each mounted on the two cassette outer side parts.

18. The transport cassette of claim 17 wherein the guide elements and the transport cassette return element each comprise rotatable rollers.

19. The transport cassette of claim 16 further including:

(a) a transport cassette main part; and (b) a carriage on which the transport cassette return element is mounted, the carriage being displaceable in the longitudinal direction with respect to the transport cassette main part when the transport cassette is in the transport cassette mounted position.

\* \* \* \* \*